(12) United States Patent
Reilly

(10) Patent No.: US 6,880,984 B2
(45) Date of Patent: Apr. 19, 2005

(54) LASER PLATFORM

(75) Inventor: Declan Reilly, Ipswich (GB)

(73) Assignee: Agilent Technologies, Inc., Palo Alto, CA (US)

( * ) Notice: Subject to any disclaimer, the term of this patent is extended or adjusted under 35 U.S.C. 154(b) by 364 days.

(21) Appl. No.: 10/164,090

(22) Filed: Jun. 6, 2002

(65) Prior Publication Data

US 2003/0228115 A1 Dec. 11, 2003

(51) Int. Cl.$^7$ .................................................. G02B 6/42
(52) U.S. Cl. ............................ 385/92; 385/90; 385/91
(58) Field of Search ...................................... 385/88–94

(56) References Cited

U.S. PATENT DOCUMENTS 6,290,401 B1 * 9/2001 Tian ............................ 385/88
6,546,172 B1 * 4/2003 Case et al. .................... 385/52

* cited by examiner

Primary Examiner—Hemang Sanghavi
Assistant Examiner—Omar Rojas

(57) ABSTRACT

This invention relates to a device and method for aligning an optical fibre with an optical device in an opto-electronic package. The invention provides a device comprising a platform for mounting an optical device, to aid coupling of the optical device with an optical fibre in an opto-electronic package comprising a first part which is attachable to the opto-electronic package; a second part moveably attached to the first part such that the second part may only move with respect to the first part along a single axis, and in which the optical device is mountable on the second part. The invention also provides a method of aligning an optical fibre with an optical device in an opto-electronic package using such a platform.

6 Claims, 4 Drawing Sheets

LASER PLATFORM

BACKGROUND OF THE INVENTION

1. Field of the Invention

This invention relates to a device and method for aligning an optical fibre with an optical device in an opto-electronic package.

2. Description of the Prior Art

Coupling efficiency between an optical fibre and an optical device, which may be an optical transmitter, or an optical receiver, is limited by the accuracy and stability of the alignment achievable during the assembly process.

Conventionally, the optical device is securely mounted in an opto-electronic package. Subsequently an optical fibre, which is usually mounted in a support tube, is aligned to the optical device. The tube is then secured to the package, for example, by soldering or welding the tube to the package. Laser welding is usually employed as it has many advantages over soldering such as no joint material, accurate position of weld spots, localised heating, no creep and more robust mode of attachment. However, a disadvantage of the support tube/laser weld technique is that of Post Weld Shift (PWS) Post weld shift occurs as a result of the contraction of the laser spot welds, and can cause the fibre to move (misalign) with respect to the optical device.

One way of achieving the alignment of an optical fibre and an optical device is by placing the optical fibre using a feature which has been etched onto a silicon optical bench, upon which an optical device has already been precisely attached. However, this simple technique is limited in precision by the manufactured accuracy of the silicon, the placement of the optical device and subsequent movement of the fibre when securing the fibre to the silicon bench. (The method of securing the fibre to the silicon bench usually involves a thermal process (e.g. soldering, adhesive curing) and due to material mismatch and differential coefficients of expansion, fibre movement can often occur.

An alternative technique uses a deformable mount to support the optical fibre. Once the optical device and the optical fibre have been aligned and attached to the package, the mount is mechanically deformed until an optimum coupling efficiency is achieved.

However, this technique suffers from the disadvantage that the deformable mount is usually only substantially deformable in one plane, and if the distance between the optical fibre and the optical device is affected by factors such as PWS, fibre attachment or deformable mount attachment, then there is no remedial action which may be taken.

In many optical applications, it is desirable for the optical fibre and optical device to be mounted as closely together as possible to maximise coupling efficiency. For example the distance required may be as little as one micron, whereas PWS can cause up to twenty to thirty microns of movement.

The present invention seeks to alleviate the above mentioned problems

SUMMARY OF THE INVENTION

According to the invention there is provided a platform for mounting an optical device, to aid coupling of the optical device with an optical fibre in an opto-electronic package comprising a first part which is attachable to the opto-electronic package; a second part moveably attached to the first part such that the second part may only move with respect to the first part along a single axis, and in which the optical device is mountable on the second part.

In a preferred embodiment the device also comprises fixing means for fixing the second part to the first part once the second part is in an optimum position.

The fixing means may advantageously be provided by a device in which a portion of the second part comprises a preform having a low melting point, and in which the second part is fixable to the first part by melting the preform such that the molten substance migrates to form a bond between the two parts when said molten substance resolidifies.

Preferably, there is provided a capillary cavity between the first part and the second part arranged to receive the molten substance.

The device may also include a deformable mount for mounting an optical fibre.

According to a second aspect of the invention, there is also provided a method of aligning an optical fibre with an optical device in an opto-electronic package comprising the steps of mounting an optical device on a platform as described above; securing the platform to the opto-electronic package; aligning the optical fibre with the optical device such that said single axis is substantially parallel with the axis of the optical fibre; securing the optical fibre to the package; and once the position of the optical fibre is stable with respect to the package, aligning the optical fibre to the optical device by moving the second part of the platform with respect to the first part in order to achieve a desired distance between said fibre and said device.

In one embodiment the optical fibre is mounted upon a deformable mount, and the method further comprises the step of aligning the optical fibre with the optical device by deforming said mount.

When the platform has a fixing means provided by a low melting point preform the method may further comprise the step of heating the preform so that it melts and secures the first part of the platform to the second part of the platform. Advantageously, the heating step comprises microwaving the preform.

Embodiments of the invention will now be described, by way of example only, with reference to the accompanying drawings in which

DETAILED DESCRIPTION OF THE INVENTION

Figure 1:
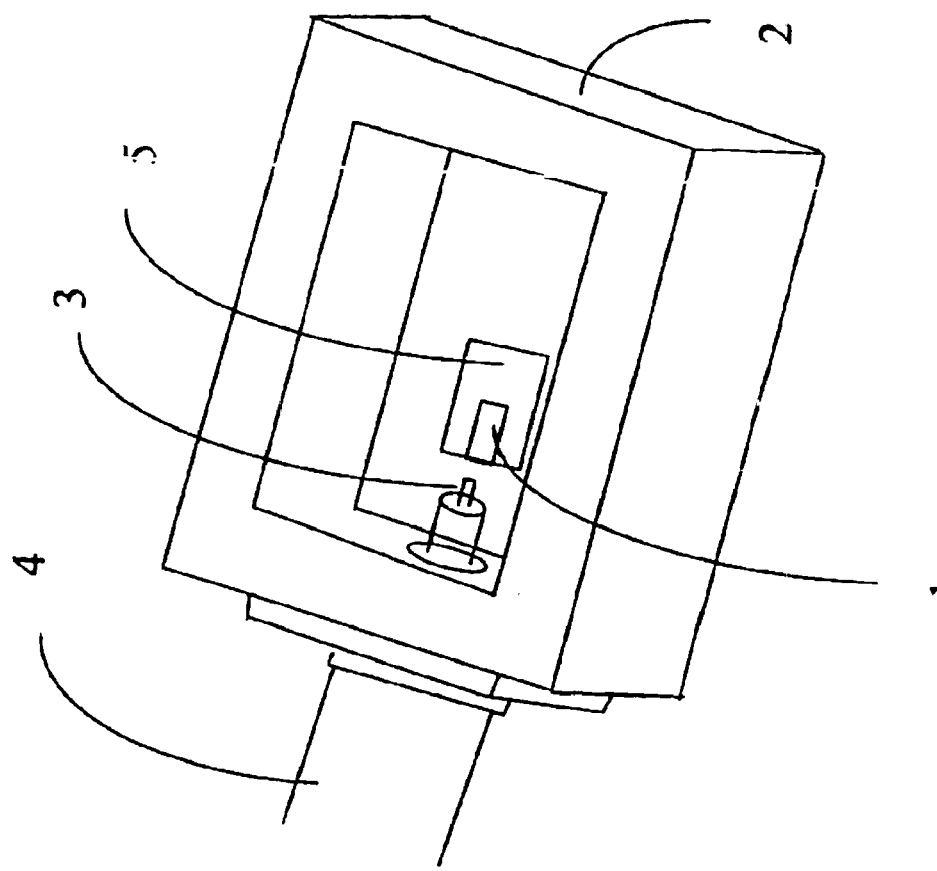
FIG. 1 illustrates an optical device mounted on a platform, which is aligned with an optical fibre in an opto-electronic package.

Referring now to FIG. 1, an optical device 1, is mounted in an opto-electronic package 2. The optical device, which may be and optical transmitter, or an optical receiver is coupled to an optical fibre 3.

An optical transmitter receives an electrical signal via an electrical connector at the rear of the package 2 and converts the electrical signal into an optical digital signal which is then transmitted via a light source (for example a laser) to the optical fibre 3.

An optical receiver receives an optical signal from the optical fibre 3. The optical signal is received via a light sensitive element and converted into an electrical signal which is then sent via an electrical connector at the rear of the package 2 to electrical devices as required.

The optical fibre 3 is mounted in a support tube 4, which is secured to the package 2. The optical device 1 is mounted on a platform 5, which is also secured to the package 2.

Figure 2:
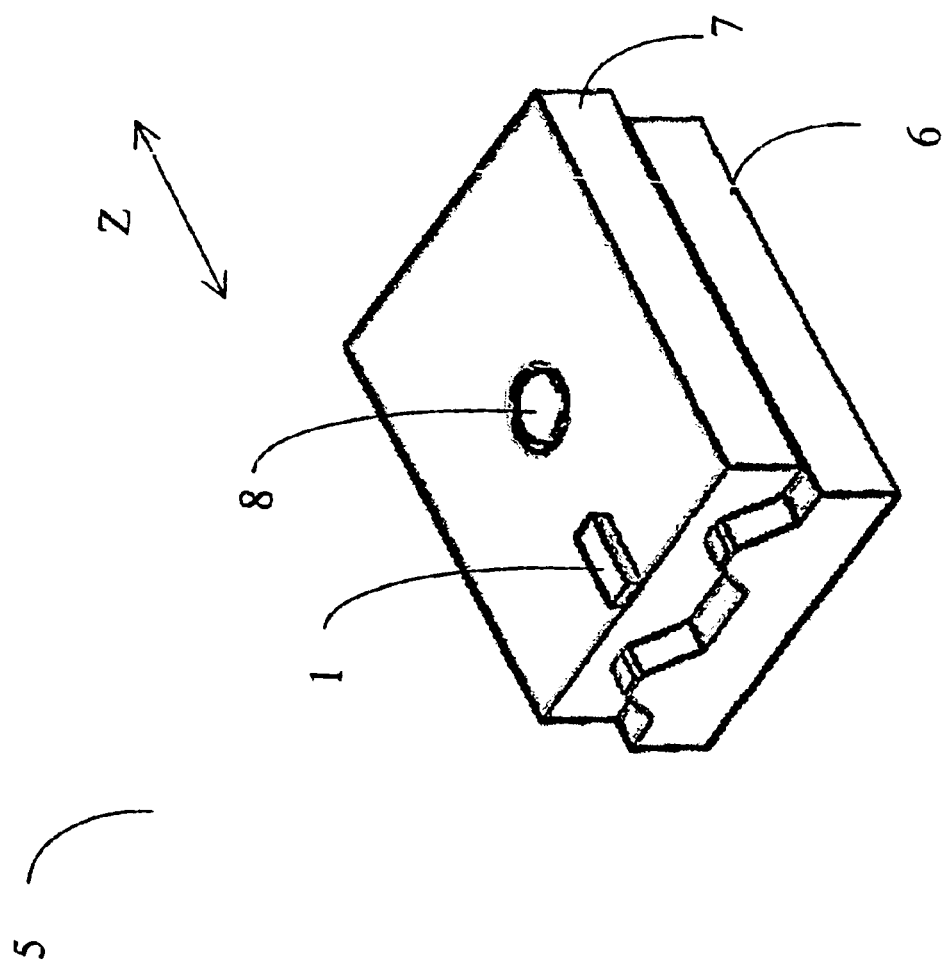
FIG. 2 is a perspective view of a platform according to one embodiment of the invention.

Referring now additionally to FIG. 2, which shows a platform 5 according to the invention upon which an optical device 1 is mounted. The platform 5 comprises a first part 6 and a second part 7. The platform is manufactured from a material which will allow alignment to be maintained under arduous operating conditions such as thermal shock, thermal cycling (alignment must be maintained over temperature variations of −40° C. to 80° C., for example) or vibration. Properties such as stiffness, coefficient of linear expansion, machineability and creep are all taken into account. Suitable materials include Kovar, Invar, Molybdenium and Silicon.

The first part and the second part may only move in the relation to one another along the axis indicated by Z. To ensure a purely linear motion with a minimum amount of friction all bearing surfaces are manufactured to be as smooth as possible, and may be plated (for example, with nickel or gold) or polished. A variety of manufacturing processes may be used to produce the platform, including photo-etching, chemical machining, laser cutting, electrical discharge machining (EDM) including electro-beam and microwave EDM.

A portion of the second part 7, comprises a preform 8, which comprises a substance having a low melting point in comparison to the platform. For example, if the platform 5 is manufactured from silicon then the preform 8 could be manufactured from glass, solder or a low shrinkage resin, for example.

The process of alignment of the optical fibre 3 and the optical device 1 will now be described. Firstly, the platform 5 is secured to the package. The optical fibre 3 is then aligned with the optical device 1. Once an optimum alignment has been achieved the support tube 4 is secured to the package 2 by a joining technique (e.g. laser welding). This joining technique, can result in movement of the fibre from its pre-aligned position, (e.g. movement due to contraction of the spot welds). It is the purpose of this invention to compensate for such movements.

Once the join is stable, and there is no further movement, the optical device is aligned to the fibre by means of the platform 5. The second part 7 is moved in respect to the first part 6 until a desired distance between the optical device 1 and the output facet of the optical fibre 3 is achieved. Then the preform 8 is melted by applying localised heat to the preform 8. The localised heat melts the preform 8 and the molten substance forms a bond between the first part 6 and the second part 7 to prevent any further relative movement between them.

If the first part 6 and the second part 7 are made from silicon, then a very localised heat can be provided by microwaves. Silicon is transparent to microwaves, and thus all of the microwave energy applied in the process can be absorbed by the preform. Thus the melting temperature of the preform is reached, without raising the temperature of the platform 5.

Figure 3:
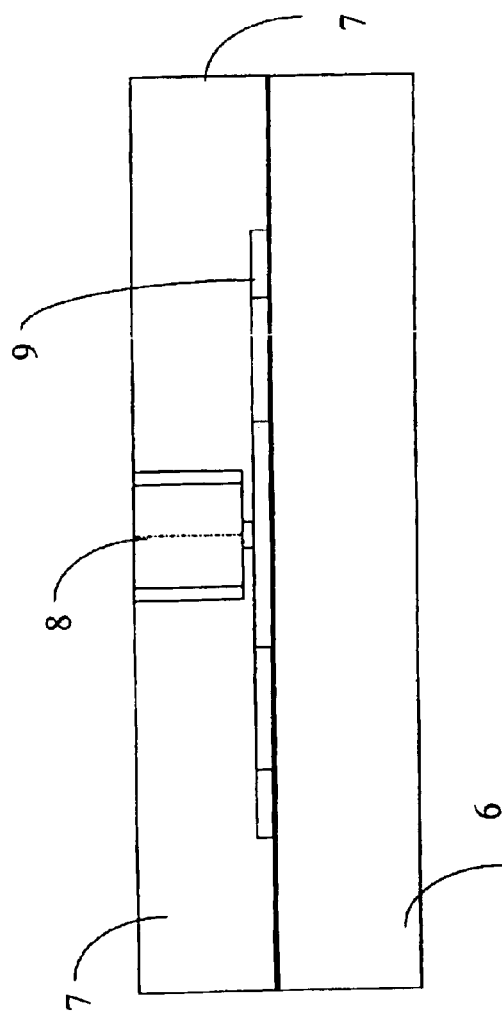
FIG. 3 is a vertical cross section of the platform of FIG. 2.
Figure 4:
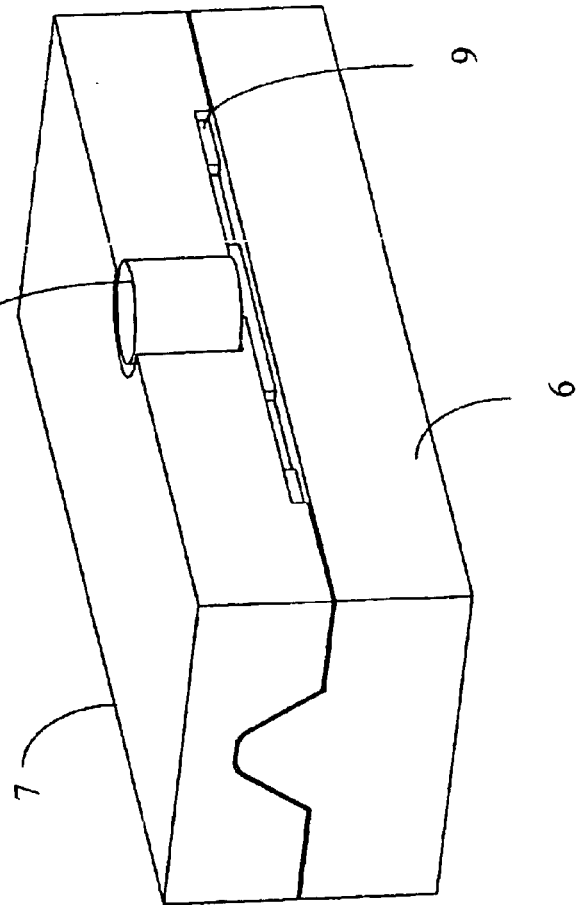
FIG. 4 is a partially cut away perspective view of the platform of FIG. 2.

FIG. 3 and FIG. 4 illustrate a capillary cavity 9, which may by advantageously utilised to draw the molten preform 8 into the cavity by capillary action. The cavity, in this embodiment of the invention is selected to avoid further movement of the second part 7 during solidification of the preform 8.

Figure 5:
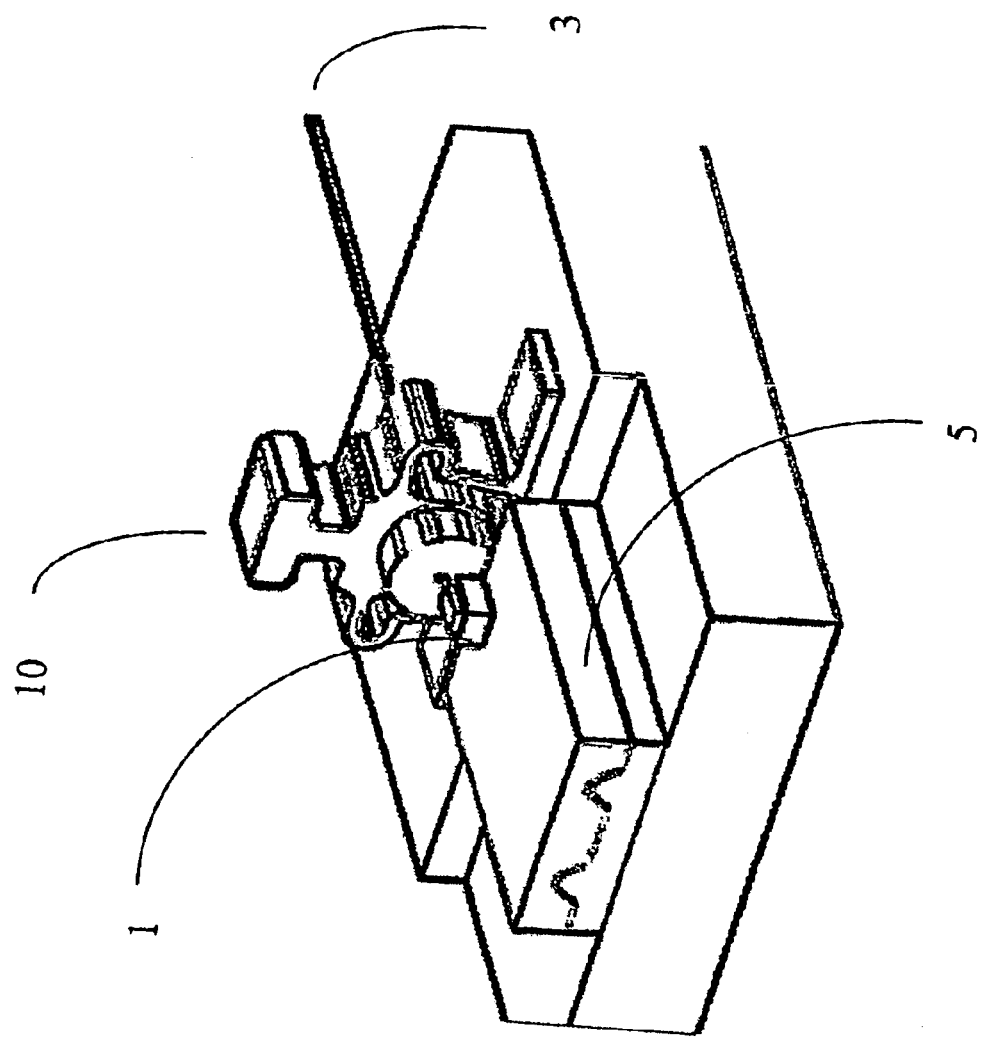
FIG. 5 shows the platform of FIG. 2 used in conjunction with a deformable mount.

FIG. 5 illustrates a deformable mount 10, which is conventionally used to align the optical fibre 3 with the optical device 1 after the optical fibre 3 has been secured to the package. It can be seen that the deformable mount 10 can be used to move the optical fibre in one plane, significant movement parallel to the axis of the optical fibre is not possible. However, when such a deformable mount is used, some movement in the direction parallel to the axis of the optical fibre is likely to occur, and therefore it is advantageous to use the platform 5 of the invention in conjunction with the use of the deformable mount 10, both to compensate for any PWS which occurs, and to compensate for any movement of the fibre toward or away from the optical device cause by use the deformable mount 10.

Whilst the invention has been described with reference to alignment of an optical device with an optical fibre, it will be clear to those skilled in the art that the invention is equally applicable to alignment of other optical components to each other. For example, the alignment of a lens to a fibre, fibre to an optical device or ferrule mounting an optical fibre to an optical device.

In the forgoing description, numerous specific details are set forth in order to provide a through understanding of the invention. It will be obvious, however, to one skilled in the art that the present invention may be practiced without using these specific details. In other instances, well-known methods and structures have not been described in detail so as not to unnecessarily obscure the present invention.

What is claimed is:

1. A device comprising a platform for mounting an optical device, to aid coupling of the optical device with an optical fibre in an opto-electronic package comprising:

a first part which is attachable to the opto-electronic package; a second part moveably attached to the first part such that the second part may only move with respect to the first part along a single axis, wherein the optical device is mountable on the second part, fixing means for fixing the second part to the first part once the second part is in an optimum position, wherein a portion of the second part comprises a preform having a low melting point, and in which the second part is fixable to the first part by melting the preform such that the melting preform migrates to form a bond between the two parts when said melting preform resolidifies, and a capillary cavity disposed between the first part and the second part and arranged to receive the melting preform.

2. A device according to claim 1, further comprising a deformable mount for mounting an optical fibre.

3. A method of aligning an optical fibre with an optical device in an opto-electronic package comprising:

mounting an optical device on a platform according to claim 1; securing the platform to the opto-electronic package; aligning the optical fibre with the optical device such that said single axis is substantially parallel with the axis of the optical fibre;

securing the optical fibre to the package; and once the position of the optical fibre is stable with respect to the package, aligning the optical fibre to the optical device by moving the second part of the platform with respect to the first part in order to achieve a desired distance between said fibre and said device.

4. A method according to claim 3, in which the optical fibre is mounted upon a deformable mount, further comprising:

aligning the optical fibre with the optical device by deforming said mount.

5. A method according to claim 3, in which the platform comprises a platform having a preform according to claim 1, further comprising the step of heating the preform so that it melts and secures the first part of the platform to the second part of the platform.

6. A method according to claim 5, in which the heating step comprises microwaving the preform.

* * * * *